US009104744B2

(12) United States Patent
Buryak et al.

(10) Patent No.: US 9,104,744 B2
(45) Date of Patent: Aug. 11, 2015

(54) CLUSTER-BASED LANGUAGE DETECTION

(75) Inventors: Kirill Buryak, Sunnyvale, CA (US); Andrew Swerdlow, San Francisco, CA (US); Clément Roux, L'Hay-le-Roses (FR); Luke Hiro Swartz, San Francisco, CA (US); Cibu Johny, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/173,572

(22) Filed: Jun. 30, 2011

(65) Prior Publication Data

US 2015/0161227 A1 Jun. 11, 2015

(51) Int. Cl.
*G06F 17/20* (2006.01)
*G06F 17/30* (2006.01)

(52) U.S. Cl.
CPC .................. *G06F 17/30598* (2013.01)

(58) Field of Classification Search
CPC ....... G06F 17/20; G06F 17/21; G06F 17/275; G06F 17/2755; G06F 17/276; G06F 17/2765; G06F 17/28; G06F 17/289
USPC ........................................ 704/8, 1, 9, 10, 257
See application file for complete search history.

(56) References Cited

U.S. PATENT DOCUMENTS

| 6,647,383 | B1 * | 11/2003 | August et al. .................... 1/1 |
| 6,993,568 | B1 * | 1/2006 | Hauduc et al. ............... 709/217 |
| 7,035,801 | B2 * | 4/2006 | Jimenez-Feltstrom ....... 704/255 |
| 7,313,587 | B1 * | 12/2007 | Dharmarajan ................ 709/201 |
| 7,451,129 | B2 * | 11/2008 | Lamping et al. ....................... 1/1 |
| 7,822,434 | B2 * | 10/2010 | Scott et al. ................. 455/550.1 |
| 7,825,901 | B2 * | 11/2010 | Potera ............................ 345/171 |
| 8,010,338 | B2 * | 8/2011 | Thorn ................................. 704/8 |
| 8,838,437 | B1 * | 9/2014 | Buryak et al. ...................... 704/8 |
| 2002/0054097 | A1 | 5/2002 | Hetherington et al. |
| 2002/0095288 | A1 * | 7/2002 | Sparre et al. .................. 704/256 |
| 2003/0149557 | A1 * | 8/2003 | Cox et al. ............................ 704/2 |
| 2004/0181778 | A1 * | 9/2004 | Tibazarwa ..................... 717/115 |
| 2004/0230416 | A1 | 11/2004 | Ye et al. |
| 2006/0210026 | A1 * | 9/2006 | Duplessis et al. .......... 379/88.05 |
| 2006/0242621 | A1 | 10/2006 | Ye et al. |
| 2007/0038586 | A1 * | 2/2007 | Vaucois .......................... 706/14 |
| 2007/0085835 | A1 * | 4/2007 | Plestid et al. ................. 345/171 |
| 2007/0208570 | A1 * | 9/2007 | Bhardwaj et al. .......... 704/270.1 |
| 2007/0288961 | A1 * | 12/2007 | Guldi et al. ...................... 725/46 |
| 2008/0126077 | A1 * | 5/2008 | Thorn ................................. 704/8 |
| 2009/0326918 | A1 | 12/2009 | Georgiev et al. |
| 2009/0327925 | A1 | 12/2009 | Smet |
| 2010/0114559 | A1 | 5/2010 | Kim et al. |
| 2010/0280965 | A1 * | 11/2010 | Vesterinen et al. ........... 705/319 |

(Continued)

OTHER PUBLICATIONS

Russo et al. "How Fluent is Your Interface? Designing for International Users", Apr. 24-29, 1993, INTiERCHI'93.*

(Continued)

*Primary Examiner* — Qi Han
(74) *Attorney, Agent, or Firm* — Remarck Law Group PLC

(57) ABSTRACT

Techniques for determining one or more preferred languages for a user are provided. The preferred languages may be determined based upon a set of language indicators. The language indicators are analyzed using, for example, rules-based techniques, clustering, language classifiers, and the like, or combinations thereof. Language indicators can include or be derived from information about the user's behavior, location, preferences, social connections, or other data related to the user.

20 Claims, 7 Drawing Sheets

(56) References Cited

U.S. PATENT DOCUMENTS

| | | |
|---|---|---|
| 2010/0287049 A1 | 11/2010 | Rousso et al. |
| 2011/0055017 A1* | 3/2011 | Solomon et al. ........... 705/14.66 |
| 2012/0016656 A1 | 1/2012 | Travieso et al. |
| 2012/0017146 A1 | 1/2012 | Travieso et al. |
| 2012/0109631 A1 | 5/2012 | Gopal et al. |
| 2013/0238339 A1 | 9/2013 | Fleizach et al. |

OTHER PUBLICATIONS

ISR of PCT/IB2013/059022 dated Apr. 1, 2014.

* cited by examiner

CLUSTER-BASED LANGUAGE DETECTION

BACKGROUND

Modern computer applications may be designed to be accessible to users who speak a wide variety of languages. It may be desirable to offer localization options to users, such as the language in which an application or service presents information. Typically, such localization options require applications to present a long list of languages, to make sure that as many users and languages as possible are supported. Users then must navigate through an extensive list, such as via a drop-down or other unwieldy interface, to locate their desired languages.

To address this issue, some applications attempt to make an educated guess as to the language a particular user may desire. This may be done either by separating an application into region-specific subdomains or interfaces. For example, a hosted service may be provided in the US and/or other English-speaking countries at a domain such as example.com. The same service may be provided at other language-specific domains with country-specific top-level domains (TLDs), such as example.cn for Chinese, example.es for Spanish, and so on. In other cases, other portions of an address or domain may provide an indication of a user's desired language, such as example.com/content/cn for Chinese, example.com/content/es for Spanish, and so on. The user's desired language may then be determined based upon which subdomain the user chooses to visit.

Another technique may include attempting to determine or approximate a user's location based on his IP address. For example, if it is determined that a user appears to be accessing an application from an IP address provided by an ISP in Germany, German may be selected as a likely preferred language of the user.

BRIEF SUMMARY

Embodiments of the presently disclosed subject matter relate to techniques for identifying one or more preferred languages of a user for an application accessed by the user. One or more language indicators may be received for the user, where each language indicator suggests one or more languages that may be a preferred language of the user. The language indicators may be used to determine a primary preferred language of the user, and/or other preferred languages. The preferred language or languages may be used to provide localization for the application, for example, by setting a language for one or more user interface elements in the application, setting the user's default input language, or localizing another aspect of the application such as date and time format, sort order, writing directionality, and so on.

Techniques according to embodiments of the disclosed subject matter may include obtaining a set of language indicators, where each language indicator is related to a language potentially preferred by a user. A set of rules may be applied to the language indicators to obtain a set of preferred languages for the user, the set of preferred languages being ordered according to a determined likelihood that each language is the user's primary preferred language. Based upon the highest-order preferred language, an application may be localized for the user.

Techniques according to embodiments of the disclosed subject matter may include obtaining a set of language indicators, where each language indicator is related to a language potentially preferred by a user. Each of a set of language classifiers may be applied to the set of language indicators to generate a confidence score for a language associated with the language classifier. A set of preferred languages for a user may be selected based upon the generated confidence scores, and an application may be localized based upon a preferred language, such as the language having the highest confidence score.

Techniques according to embodiments of the disclosed subject matter may include obtaining a set of attribute clusters, where each cluster is associated with a language. A user profile made up of a set of language indicators for the user may be obtained, where each language indicator relates to a language potentially preferred by the user. Based upon the language indicators, a user cluster having a highest correlation with the language indicators may be determined. An application may then be localized based upon a language associated with the user cluster.

Techniques according to embodiments of the disclosed subject matter may include, for each of a plurality of entities in a user's social graph, obtaining a preferred language associated with the entity. Based upon the preferred languages obtained for the plurality of entities, a set of preferred languages may be selected for the user, and an application localized based upon at least one of the languages.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
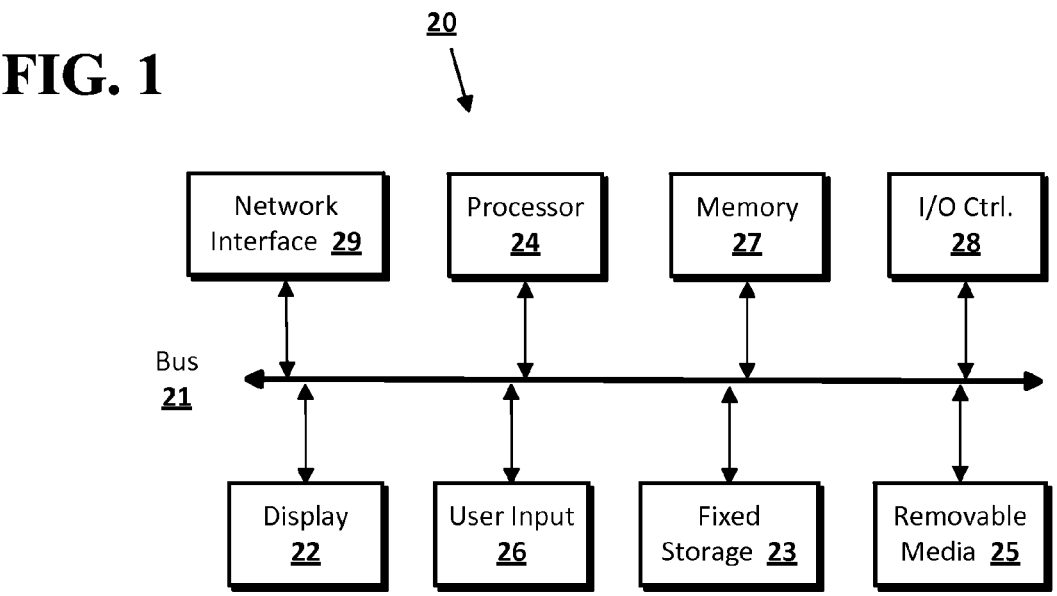
FIG. 1 shows a computer according to an embodiment of the disclosed subject matter.

Embodiments of the presently disclosed subject matter allow for more accurate prediction of a language or languages in which a user may desire to access an application. The determined languages may be presented as the earliest or otherwise most prominent options in a localization option for the application, or one or more languages may be selected as the default for the application. Additional techniques also allow for determining and using localization preferences for multiple users or groups of users.

Embodiments of the presently disclosed subject matter may provide techniques and computing arrangements for determining one or more languages that a user may prefer to use, such as when accessing a software application or service. A variety of language indicators may be obtained for the user, and used to generate a set of languages that may be preferred by the user. Confidence measures also may be generated for each potential language, and the set of languages may be ordered according to the confidence measures or other values that indicate the relative preference or likelihood that each language is preferred by the user.

As used herein, a "language indicator includes any data item that provides information regarding a language that a user may wish to use, for example when accessing a software application or service. Generally, any information that can be used to determine, estimate, or assign a likelihood that a language is usable by and/or preferred by a user may provide a language indicator. A language indicator may provide a binary indication or decision with respect to a particular language, such as to indicate that the language may be or is not acceptable to the user. For example, a language indicator that indicates the user is located in Canada may suggest that English and/or French are acceptable, but may not provide any indication about the acceptability of other languages. Specific examples of language indicators are provided below. The examples are illustrative, and are not intended to be exhaustive or limiting of the type of data that may be included in or provide language indicators for use with embodiments of the presently disclosed subject matter. Other information may be used and manipulated as disclosed herein with respect to the illustrative language indicators and, unless specifically indicated to the contrary, any other language indicators may be used in the techniques and arrangements disclosed herein.

The user's location and/or IP address may provide a language indicator. For example, the user's geographical location may be determined based upon the user's IP address via conventional geo-location techniques, or based upon other information about or obtained from the user. Different geographical locations may suggest different languages. For example, an IP address in the US may suggest that a user's preferred language is English, whereas an IP address in Canada may suggest a preferred language of English or French. As another example, a language may have several versions, dialects, or other alternate forms. In some cases, the alternate forms may be associated with one or more geographical regions. For example, a user within southern China may prefer a different dialect than a user in northern China. Similarly, a user in Shanghai or other large city may prefer a different dialect than a user in a remote or less-populated region. Such geographical data may be collected, for example, based upon users' explicit language preferences, and correlated with those users' geographic regions as determined from the users' IP addresses or other data. As disclosed herein, smaller geographic areas also may be used, such as where distinct sub-populations may be identified within a region.

The user's originating domain and/or an entry domain may provide a language indicator. For example, if a user accesses a service via a domain in the .es (Spain) top-level domain, this language indicator may suggest a preferred language of Spanish. Similarly, a user may access a site or service via a country- or region-specific domain, such as example.com.ca within Canada, example.co.uk within the UK, and the like. Such a language indicator may suggest that the user's preferred language is an official or predominant language within the region or country associated with the entry domain.

A language associated with another user that is connected to the user by way of, for example, a social network, may provide a language indicator. For example, a user may be connected to several other users that have selected a particular language, that have posted information in a particular language, or that are otherwise associated with a particular language. Such indications by socially-connected users may suggest that the user has a preference for the same language as one or more of the socially-connected users. The user also may be connected to multiple users via a social network or similar connection, where each other user has indicated a preference for different languages. As disclosed herein, these language indicators may be weighted, averaged, or otherwise analyzed to determine one or more languages that will likely be preferred by the user. As disclosed herein, one or more languages used by a user in another application, and/or used by the user to send or receive messages, may provide a language indicator. In some cases, the application may be a social network or related application. For example, the language used by a user and/or entities to which the user is connected in a social network may provide a language indicator. As a specific example, a user may communicate with other entities in a social network to which the user belongs in a specific language. This may suggest that the language is a preferred language of the user.

A language setting in a user's web browser or other software application may provide a language indicator. For example, if a user has set his browser to operate in a particular language, this may indicate that the language to which the browser or other application is set is a preferred language of the user. In some cases, such an explicit preference may be determinative of the user's primary preferred language. However, in some cases a language setting in a browser or other application may be set by an entity other than the user, such as by way of an enterprise-level policy, an administrator configuration option, or other setting that is not chosen directly by a user. Thus, such a setting may be considered with other language indicators as disclosed herein to determine the user's preferred language or languages.

A setting in an input method editor or other input setting or constraint may provide a language indicator. For example, a user may configure a device to accept input in a character set and/or display input or other data in a font typically associated with a particular language (such as Spanish, French, Russian, and the like). Such a configuration may suggest that the associated language is preferred by the user. The input method editor or other input setting may be determined from a device used by the user to access an application that attempts to determine the user's preferred language or languages.

A setting or data stored in a cookie associated with the user may provide a language indicator. For example, a user may have previously accessed an application or otherwise visited a website that stored a cookie at the user's access device, such as to store a user's preference regarding language use at that application. Such an indication in a cookie or equivalent preference storage mechanism may suggest that the indicated language is a preferred language of the user.

A preference or other setting in another application accessed by the user may provide a language indicator. For example, if a user first accesses a search application, the user may specify a preferred language for search results, or may submit search queries in a preferred language. As another example, a user may access a translation application or other service, and request translations to a particular language. If the user subsequently accesses, for example, an email, calendar, social networking, or other application that shares preferences with the initial search or translation application, or if the user otherwise provides his search or translation application preferences to a second application, the language preference in the first application may suggest a preferred language for the second application. For example, the language to which a user requests translations in a translation application or service may provide an indication that the target language is a preferred language of the user. Generally, an indication of a language in which data is accessed by the user in one application may provide a language indicator for another application accessed by the same user.

A user's history, such as a browsing history or search query history, may provide a language indicator. For example, if a user's browsing history includes sites in a particular language, the history may suggest that the language is preferred by the user. As another example, locations, regions, addresses, and the like that the user has searched in a map or other search application may suggest that a language associated with the locations is a preferred language of the user. As a specific example, if a user has accessed map data for locations in Quebec, this search history may suggest that French and/or English are a preferred language for the user.

The language in which content accessed or created by the user is written may provide a language indicator. For example, if a user receives, sends, or otherwise accesses emails or other messages in a particular language, such activity may suggest that the language is a preferred language of the user. The language may be detected automatically based upon an analysis of messages associated with the user.

Settings on a mobile or other device of the user may provide a language indicator. For example, if a user's mobile device is configured to use a particular language when accessing an application, the language may be a preferred language of the user. The language setting may be provided explicitly by the device during access of the application, or it may be extrapolated from other information provided by the device. For example, the user may select a language in which the device is configured to operate, which selection may be communicated to other applications. As another example, localized versions of a single device or type of device may be available. Information provided by such a device, such as a version number, localization identifier, or the like, may provide a language indicator that suggests the associated language is a preferred language of the user.

Figure 3:
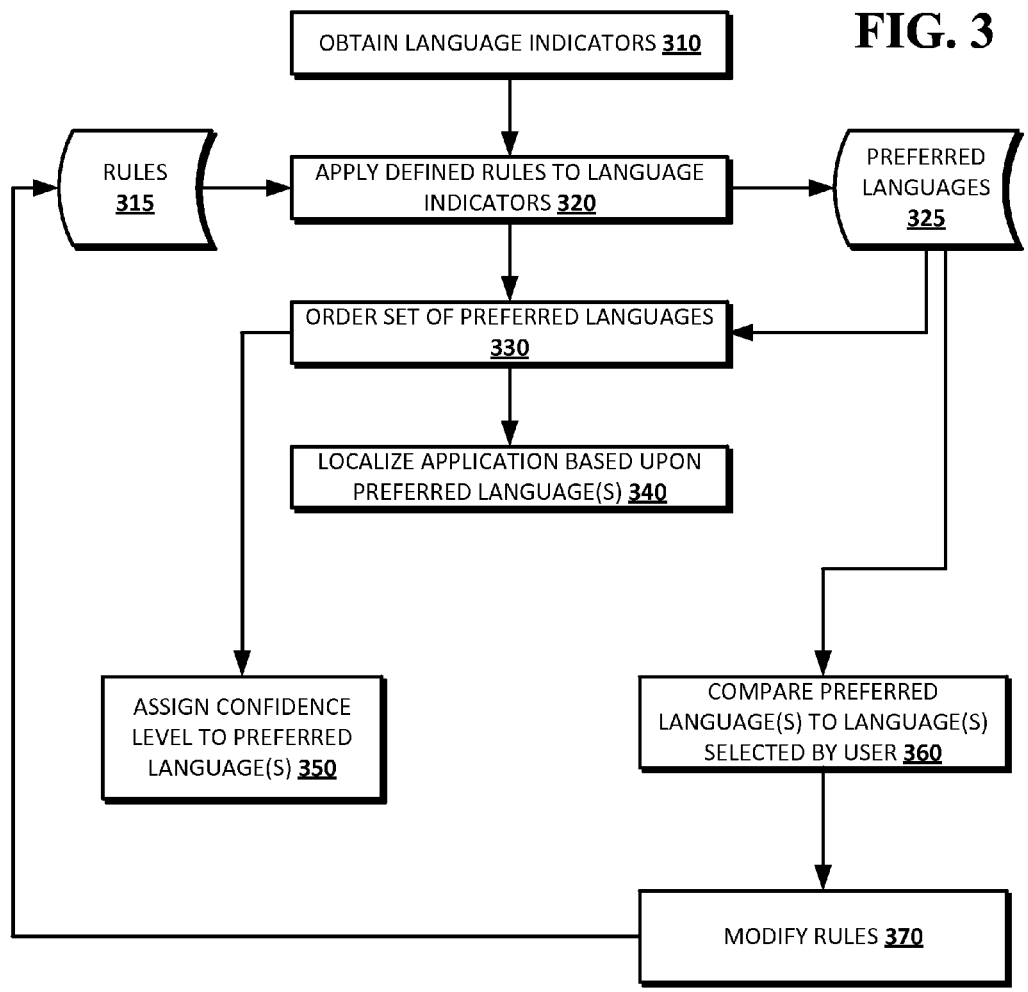
FIG. 3 shows a technique for determining one or more preferred languages for a user according to an embodiment of the disclosed subject matter.

FIG. 3 shows a technique for determining one or more preferred languages for a user according to an embodiment of the disclosed subject matter. At 310, a set of language indicators may be obtained, where each indicator is related to a language that may be preferred by the user. The set of language indicators may include one or more of the types of data disclosed herein as providing language indicators, or any other indicator of a potentially-preferred language for a user. It may include multiple language indicators or combinations of language indicators as disclosed herein. At 320, a set of rules 315 may be applied to the language indicators to obtain a set of preferred languages 325 for the user. The rules may be a set of weightings, decisions, and/or other selection criteria that identify each of one or more languages as being preferred or not preferred by the user. For example, the rules may specify that if a particular language indicator or indicators indicate that a language is used by the user, that language should be considered a preferred language of the user. The rules also may specify a priority order for the language indicators. For example, the rules may assign an order to the language indicators. In such a configuration, if the highest-ordered language indicator provides a suggestion of a preferred language of the user, that language may be accepted as a preferred language. If it does not provide a suggestion, the second-highest-ordered language indicator may be used to determine a preferred language of the user. Similarly, the rules may indicate a preference order of the preferred languages. For example, the highest-ordered language indicator may be used to select the primary preferred language, the second language indicator used to select the second preferred language, and so on.

For example, a rule set may specify that language indicators should be considered in the following order of preference: explicit user preference, email language, browser history, and social network language. That is, an explicit user preference language indicator may be the highest-ordered, the email language indicator the second-highest, and so on. In this example, if an explicit user preference indicator exists, the language suggested by the user preference indicator is selected as the primary preferred language for the user. Languages suggested by the email language, browser history, and social network language indicators, if any, may be selected as preferred languages in decreasing order of preference as specified by the rule. If no explicit user preference indicator exists, then a language suggested by an email language indicator may be selected as the user's primary preferred language, and any languages suggested by the browser history and social networking language indicators, if any, may be selected as preferred languages in decreasing order of preference. Similarly, the browser history and social network language indicators may be used to determine the user's primary preferred language in turn. Other language indicators, rule sets, and ordering may be used.

As another example, a rule set may specify that a primary preferred language should be determined based on a several language indicators, such as counting the number of indicators that suggest each language. The language with the most number of indicators suggesting the language may be selected as the primary preferred language, and the remaining suggested languages selected as additional preferred languages in order of preference based upon the number of indicators that suggest each language. As a specific example, a user profile may include ten language indicators that have data that suggests a preferred language. If five language indicators suggest English (US), three suggest English (UK), and one suggests each of French and Spanish, an ordered list of preferred languages may be created as English (US), English (UK), French, Spanish in decreasing order of preference.

As a specific example, an HTTP request received from a user may indicate that the user's IP indicates the user's location is Belgium. The top suggested languages may then be Dutch/Flemish, German, or French. The list may be narrowed based upon one or more other language indicators. For example, if the user has used a translate service with the target language set to French, French may be selected as a preferred language of the user.

As another specific example, if the user's social graph is known or inferred, and the majority language of the users social graph is German, German may be selected as a preferred language.

At 330, the set of preferred languages may be ordered according to a determined likelihood that each language is the user's primary preferred language. As used herein, a "primary preferred language" for an application or other context refers to the language that the user would most prefer the application to be presented in. A user may have several preferred languages and/or primary preferred languages, such as where a user is multilingual and does not have a preference among those languages in which he is fluent.

At 340, the ordered list of preferred languages may be used to provide a localization of an application to the user. For example, a user interface element associated with the application being accessed by the user may be provided in the language identified as the user's primary preferred language. The user interface element may be a portion of the application, such as a user control or a portion of text generated by the application, a set of such elements, or the entire application interface. The user interface element also may include output of the application intended for use by the user. In general, a user interface element may refer to any portion of an application that is accessible by, visible to, or otherwise exposed to a user. In general, localization of an application also may refer to, for example, setting a language for one or more user interface elements in the application, setting the user's default input language, or localizing another aspect of the application such as date and time format, sort order, writing directionality, and the like.

As another example, a language selection or other localization interface may be provided that more prominently identifies the preferred languages relative to other languages available in the application. For example, an application may include many languages in which the application can be presented to a user. If the user is only interested in a few of the many available languages, it may be difficult for the user to identify the languages of interest using a conventional interface. In contrast, embodiments of the presently disclosed subject matter may present the preferred languages more prominently, such as at the top of a selection interface, thereby simplifying the process of the user identifying and selecting a preferred language. Other interfaces may be provided.

Figure 4:
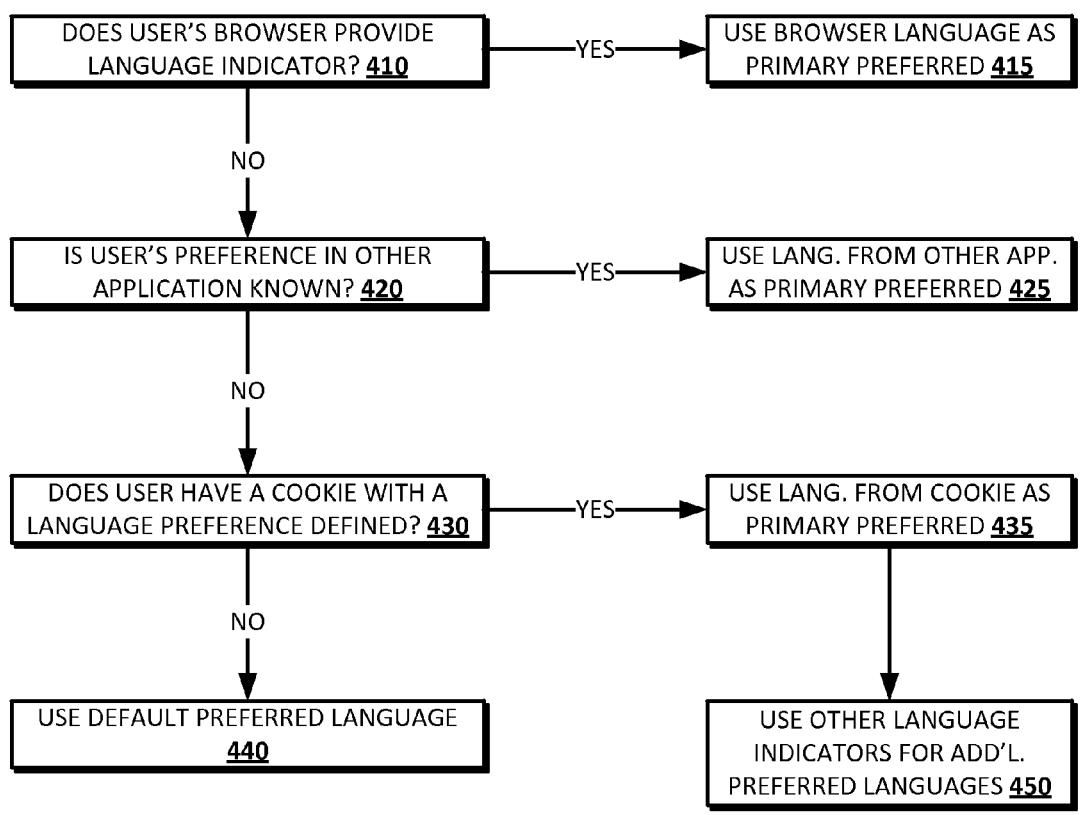
FIG. 4 shows an example technique for applying rules according to an embodiment of the presently disclosed subject matter.

Various rule sets and rule application techniques may be used. FIG. 4 shows an example technique for applying rules according to an embodiment of the presently disclosed subject matter. In the illustrated example, it is presumed that a rule set specifies an order in which language indicators are examined to determine whether each of a set of languages is the user's primary preferred language. The specific order in which language indicators are considered in FIG. 4 is illustrative only, and it will be understood that any order may be used. More generally, a predefined order of language indicators may be used, in which each indicator is considered sequentially to determine if it identifies a language usable or preferred by the user. Other language indicators may be used to identify additional preferred languages, such as to provide as initial options in a localization interface.

Referring to the illustrative example in FIG. 4, at 410 a first language indicator may be considered. For example, communications from a user's web browser or other application or device may be examined to determine if the browser provides an explicit indication of a preferred language, for example via a setting, request, header language, or the like. If so, at 415 the indicated language may be adopted as a preferred language for the user, such as the user's primary preferred language. If not, at 420 another language indicator may be considered, such as any explicit preferences set in another application accessed by the user. If the language indicator identifies a language, e.g., if another application accessed by the user identifies a language preferred or used by the user, at 425 the language may be identified as a preferred language of the user. Otherwise, at 430, another language indicator may be considered, such as whether a cookie stored at a user device indicates a language preference. If so, the indicated language may be accepted as a preferred or primary preferred language at 435. It will be understood that any number of language indicators may be considered sequentially in a similar process. Once the indicators of interest have been considered, a default preferred language may be accepted at 440. Also, additional preferred languages may be obtained based upon other language indicators. For example, if a primary preferred language is identified at 425, languages identified by language indicators considered at and subsequent to 430 may be selected as additional preferred languages.

In another example technique for applying rules to language indicators according to an embodiment of the disclosed subject matter, the number of language indicators that signal each language may be determined. Each language indicator for which data is available may be considered to determine which language is suggested by the indicator. Based upon the results, a primary preferred language may be identified. In one configuration, the language having the highest number of language indicators that suggest the language may be selected as the primary preferred language. For example, data may be available for a user related to 10 language indicators as disclosed herein. Upon examining each language indicator, it may be determined that five suggest "English (US)", three suggest "English (UK)", and two suggest English without displaying a particular preference for either variant. In this example, "English (US)" may be selected as the primary preferred language, and "English (UK)" may be selected as a preferred language. Other techniques may be used. For example, language indicators may be weighted based upon the amount of data available for each, the historical reliability of each in predicting a primary preferred language, or other factors.

Referring again to FIG. 3, in an embodiment of the disclosed subject matter, at 350 confidence levels may be assigned to one or more preferred languages identified based on the language indicators or other data. The confidence levels may indicate the calculated likelihood that each language is a preferred language of the user, or that the language is the primary preferred language of the user. For example, confidence levels may be calculated based upon the language indicators used to identify a user's preferred languages. As a specific example, a preferred language may be determined based upon the connections in a user's social graph as described in further detail herein. In this example the confidence level for a language X may be a numeric value that is directly proportional to the number of entities in the user's social graph that are determined to speak the language X, divided by the total number of entities in the user's social graph. When using machine learning classification techniques as disclosed herein, confidence levels may be provided by the associated classification algorithm. In some cases, confidence levels may be derived from numeric values of a target function being optimized by the classification algorithm. For example, clustering techniques provide a confidence level based upon each cluster's purity, i.e., the number of user profiles in a cluster that represent the majority language of the cluster, divided by the number of profiles in the cluster. As another example, in a rules-based classification technique, confidence levels may be calculated based upon a number of rules positively triggered when analyzing the language indicators for a user, divided by the total number of rules processed or available in the system. Each rule also may have an associated weight to reflect a determination that some rules are more accurate predictors of preferred languages than others. In other cases, all rules may have an equal weight.

In some configurations, the confidence levels may be used to order the preferred languages at 330. The confidence levels may be used for other purposes, such as to determine languages that should be offered as potentially preferred languages in a user interface as disclosed herein.

In an embodiment of the disclosed subject matter, the rules 315 may be updated based upon the observed accuracy of the preferred language identification techniques disclosed herein. For example, at 360 the preferred languages identified by the technique illustrated at 310-330 may be compared to one or more languages selected by the user. Based upon the comparison, the rules 315 may be modified at 370. Example modifications may include assigning different weights to language indicators, modifying the order in which language indicators are considered to identify a primary preferred language, adding and removing rules from the rule set, and the like. The modified rules may be used to determine subsequent preferred languages.

Figure 5:
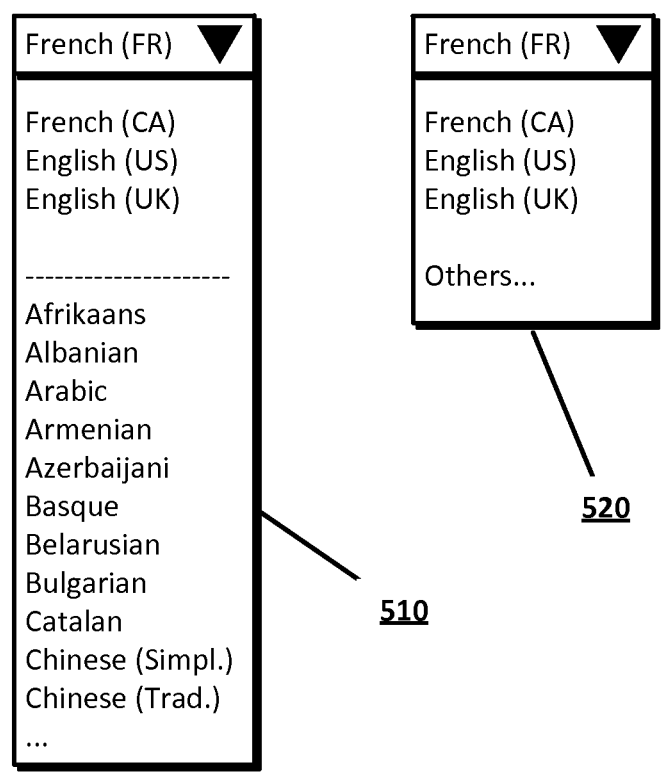
FIG. 5 shows example user interfaces that may be provided at according to embodiments of the disclosed subject matter.

FIG. 5 shows example user interfaces that may be provided at 340 according to embodiments of the disclosed subject matter. The user interface may be, for example, a drop-down or other selection element that allows a user to select a desired language for the application. In some configurations the application may be provided to the user in a primary preferred language identified through the procedure described with respect to FIG. 3 or other techniques disclosed herein. The example user interfaces 510, 520 may then provide a way for the user to change the language in which the application is presented. In some configurations, languages identified as preferred languages may be presented first, out of order, or otherwise highlighted to the user for easier or more rapid selection. For example, the interfaces 510, 520 may correspond to applications in which "French (FR)" was identified as the primary preferred language, and each of "French (CA)", "English (US)", and "English (UK)" was identified as preferred languages. Other languages in which the application is available may be listed in the interface 510, or may be accessible via another interface element ("Others . . . ") 520. Other interfaces and arrangements may be used. The interfaces shown in FIG. 5 may be used to change a language in which the application is presented to the user. As previously described, embodiments of the disclosed subject matter also may allow any other user interface elements to be presented in a preferred language. Other user interface elements may change the language in which they are presented based upon a user preference, such as a language selected from an interface such as shown in FIG. 5.

Figure 6:
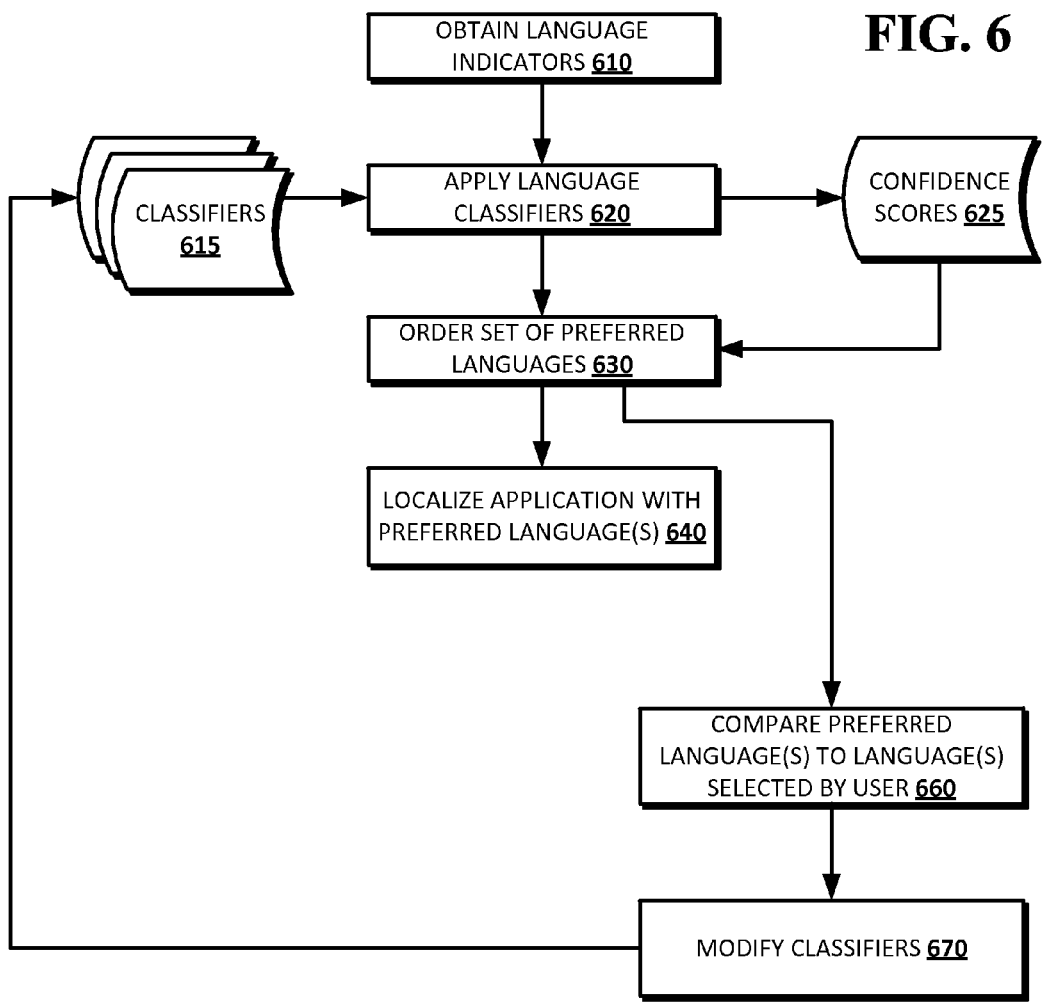
FIG. 6 shows a process for determining a user's preferred language according to an embodiment of the disclosed subject matter.

FIG. 6 shows a process for determining a user's preferred language according to an embodiment of the disclosed subject matter. At 610, a set of language indicators may be obtained, where each indicator is related to a language that may be preferred by the user. The set of language indicators may include one or more of the types of data disclosed herein as providing language indicators, or any other indicator of a potentially-preferred language for a user. It may include multiple language indicators or combinations of language indicators as disclosed herein. A set of language classifiers 615 may then be applied to the obtained language indicators at 620 to obtain confidence scores 625 for languages associated with the language classifiers 615. In an embodiment, a language classifier may be a component that analyzes a set of language indicators and returns a confidence score indicating the determined likelihood that a language associated with the language classifier is the user's primary preferred language. In an embodiment, each language classifier is designed to generate a confidence score for a single language. Examples of language classifier arrangements may include decision tree based systems, support vector machines, regression systems, or other similar machine learning classification techniques as will be readily understood by one of skill in the art. As a specific example, a language classifier may construct and/or apply a decision tree constructed based upon one or more sets of user language indicators. The decision tree may have been previously constructed or modified based upon known user preferences. The decision tree may include several nodes, each of which is associated with a language indicator. By traversing the tree, the classifier may arrive at a language that is determined to have the highest probability of being the user's primary preferred language. The tree also may provide a confidence level for the language. Techniques for constructing decision trees and similar classifiers generally will be readily understood by one of skill in the art.

At 630, the confidence scores may be used to determine a set of preferred languages for the user. The preferred languages may be ordered according to the confidence scores, i.e., in order indicating the likelihood that each language is the user's primary preferred language. At 640, a set of preferred languages may be used to provide localization for an application accessed by the user, such as by providing a user interface or other item to the user. As previously disclosed, FIG. 5 shows illustrative examples of user interfaces constructed from an ordered set of preferred languages for a user. For example, an interface to the application being accessed by the user may be provided in the language identified as the user's primary preferred language. As another example, a language selection or other localization interface may be provided that more prominently identifies the preferred languages relative to other languages available in the application. Other interfaces may be provided.

In an embodiment of the presently disclosed subject matter, weights may be assigned to the language indicators obtained at 610 as previously disclosed. For example, each language indicator may have a weight assigned to it that indicates the relative importance of the indicator relative to other indicators. The confidence scores 625 may be calculated based upon the weighted language indicators.

In an embodiment of the disclosed subject matter, the language classifiers may be calibrated based upon a common set of training data. As will be readily understood by one of skill in the art, such training may be performed by providing each language classifier with a set of training data, then evaluating the predictive power of each language classifier in identifying preferred languages based upon the training data.

In an embodiment of the disclosed subject matter, the language classifiers 615 may be updated based upon the observed accuracy of the preferred language identification techniques disclosed herein. For example, at 660 the preferred languages identified by the technique illustrated at 610-630 may be compared to one or more languages selected by the user. Based upon the comparison, the classifiers 615 may be modified at 670. Example modifications may include assigning different weights to language indicators to identify a primary preferred language, suppressing known "false hits" or other identifiable errors in the classification, and the like. The modified language classifiers may be used to determine subsequent preferred languages.

Figure 7:
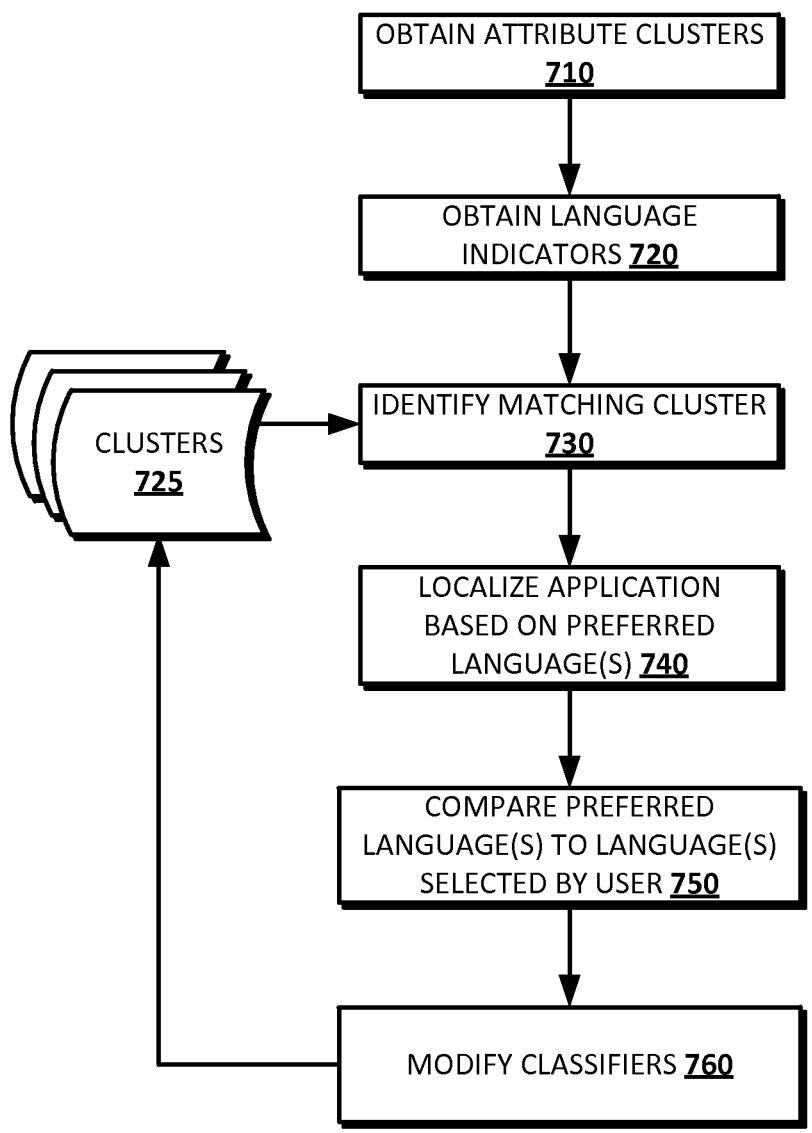
FIG. 7 shows a clustering technique for determining a preferred language according to an embodiment of the disclosed subject matter.

FIG. 7 shows a clustering technique for determining a preferred language according to an embodiment of the disclosed subject matter. At 710, a set of attribute clusters may be obtained, each of which is associated with at least one language. An attribute cluster refers to a definition of a set of language indicators or other attributes that are shared among users who have a common preferred language. The number of clusters may be chosen, for example, based on the number of languages supported by the application. Further information regarding specific clustering techniques suitable for use with embodiments of the presently disclosed subject matter is provided elsewhere herein. At 720, a set of language indicators may be obtained for a user as previously described and, at 730, an attribute cluster 725 that has a highest correlation or otherwise a best fit to the language indicators may be identified. The highest correlation cluster may be identified, for example, as the cluster having the most language indicators in common with those received for a user. It may be possible for multiple clusters to have the highest correlation to a set of language indicators, or for no cluster to have a highest correlation.

At 740, a language associated with the identified cluster may be determined to be a preferred language for the user and, for example, a localization may be provided for an application accessed by the user. For example, an application or a user interface element of an application may be presented to the user in the language associated with the cluster. In some configurations, languages associated with clusters that share some attributes with the language indicators for the user, but that do not have the highest correlation, may be used to construct a set of preferred languages for the user. These languages may be used as alternates to the primary preferred language identified based upon the highest-correlation cluster. As previously disclosed, FIG. 5 shows illustrative examples of user interfaces constructed from an ordered set of preferred languages for a user. For example, an interface to the application being accessed by the user may be provided in the language identified as the user's primary preferred language. As another example, a language selection or other localization interface may be provided that more prominently identifies the preferred languages relative to other languages available in the application. Other interfaces may be provided.

In an embodiment of the disclosed subject matter, the clusters 725 may be updated based upon the observed accuracy of the preferred language identification techniques disclosed herein. For example, at 750 the preferred languages identified by the technique illustrated at 710-740 may be compared to one or more languages selected by the user. Based upon the comparison, the clusters 725 may be modified at 760. Example modifications may include moving a language indicator from one cluster to another, removing an indicator from a cluster, suppressing known "false hits" or other identifiable errors in the classification, and the like. The modified clusters may be used to determine subsequent preferred languages.

An embodiment of the disclosed subject matter may include defining the set of user clusters 725. For example, language indicators and primary preferred languages for a group of users may be determined. The user profiles (sets of language indicators) may be grouped, with users having common language indicators being grouped together. Once the profiles are grouped, attribute clusters may be defined based upon the groupings. A language common to the user profiles may then be assigned to the cluster, where the language has been determined based upon language indicators, other preferred language identification techniques as disclosed herein, or explicit user preference.

In general, a clustering algorithm may consider a number of language indicators for a user (the user's "profile"). The number of language indicators considered for each user may vary, for example from a few, to tens or hundreds of indicators for each profile. Clustering algorithms may determine a clustering arrangement that achieves a threshold probability, or achieves a maximum probability, that users in the same cluster have a maximum number of language indicators in common. As will be readily understood by one of skill in the art, the specific target function used by a clustering algorithm may vary. For example, a Distributed Exchange Algorithm uses a probabilistic target function to maximum information between user profiles within each cluster, which results in a maximum probability of the most possible overlap of user language indicators within each cluster.

The process of clustering user profiles that include language indicators may be performed using one or more appropriate clustering algorithms, such as a Hierarchical Agglomerative Clustering algorithm, k-means clustering, or Expectation Maximizations [EM] clustering, using the set of language indicators for each user. Within the clusters, users may be clustered based on their language preference, i.e., English-speaking users are clustered together, French-speaking users are clustered together, and so on. Clustering techniques may be suitable for situations in which users with similar language preferences also display similarities in terms of the language indicators available for the users. For example, users that share a language also may be likely to share the same geographic location, to have social graphs with the same or a similar dominant language, and the like. Clustering algorithms according to embodiments of the presently disclosed subject matter may process user language indicators and other data to create a clustering arrangement in which the users' profiles in the same cluster share the maximum number of common attributes. Clustering approaches according to embodiments of the presently disclosed subject matter also may be referred to as "unsupervised machine learning" techniques. Such techniques may be characterized by the fact that the system may not be trained on a predefined set of data. Rather, the desired data partitioning by preferred language may emerge naturally by selecting the right set of language indicators for a set of users, which have the most correlation to the target variable.

The effectiveness of a clustering technique, i.e., its precision and recall metrics, may be measured by injecting target data set with a test data set of user profiles with preferred language known in advance. The known preferred languages may have been set by the user. After the user profiles, including unknown and known preferred languages, have been clustered, the distribution of user profiles with a known preferred language may be analyzed. A clustering technique that produces a clustering having a relatively high number of users with a known preferred language being clustered together may be deemed as having the highest quality of clustering.

Figure 8:
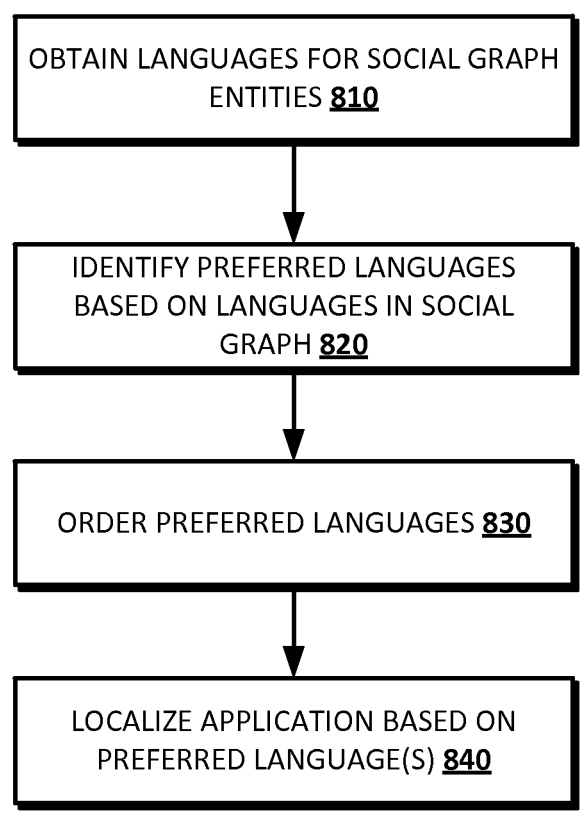
FIG. 8 shows an example technique for determining a preferred language based upon a user's social graph according to an embodiment of the presently disclosed subject matter.

FIG. 8 shows an example technique for determining a preferred language based upon a user's social graph according to an embodiment of the presently disclosed subject matter. At 810, a preferred language may be obtained for each of a plurality of entities in a user's social graph. A "social graph" refers to a set of entities that are connected to the user by way of a social networking site or similar application that allows the user to make social connections to other entities. The social graph may be represented as a graphical chart of connections between entities and/or social networking applications, a list of entities and/or relationships relevant to the user, or the like. The social graph of a user may be determined, for example, by crawling one or more social networks in which the user is a participant, such as with an automated indexing process. The social graph also may be provided by the user, for example as a list of connections or contacts.

Each entity in a social graph may be another user, an account, a website, a corporation, or any other entity that may use the social networking applications. It may be possible to determine whether a language is a preferred language for an entity in the social graph based upon the entity's actions within a social networking application. For example, if an entity posts news or status items in a particular language, that language may be identified as a preferred language of the entity.

A preferred language for a particular entity in a user's social graph may be determined in a variety of ways. For example, one or more language indicators may be obtained for the entity, such as a language the entity has used to participate in a social network, a geographical location of the entity, and so on, using any of the language indicators described herein or any other language indicators. One or more preferred language filters may then be applied to the language indicators for the entity. A preferred language filter refers to a rule, algorithm, selection metric, or other technique for determining whether a language is preferred by an entity. For example, a preferred language filter may include a rules-based filter, such as the rules-based techniques disclosed herein. Similarly, preferred language filters may include language classifiers and/or language clustering techniques as disclosed herein. Such filters may be used alone or in any combination, for example by weighting the preferred languages as identified by multiple filters.

At 820, a set of preferred languages for the user may be obtained based upon the preferred languages obtained for the plurality of entities. For example, each language that is a preferred language for one or more entities in the user's social graph, or each language having a minimum number of entities for which it is a preferred language, may be selected. The set of preferred languages may be ordered according to a determined probability that each language is the user's primary preferred language at 830. For example, the set may be ordered based upon the number of entities in the user's social graph for which each language is a preferred language. At 840, one or more of the languages may be selected as a preferred or primary preferred language for the user, and used to localize an application accessed by the user. For example, a preferred language may be used to generate a user interface element for the user in the language. For example, a user interface element for an application may be presented to the user in the highest-ordered preferred language. Other languages that are used by entities in the user's social graph also may be used as preferred languages of the user. For example, languages used by less than the highest number entities in the social graph may be used to provide suggested alternatives to the primary preferred language, and may be presented in a user interface element such as a localization or language selection element. As previously disclosed, FIG. 5 shows illustrative examples of user interfaces constructed from an ordered set of preferred languages for a user. For example, an interface to the application being accessed by the user may be provided in the language identified as the user's primary preferred language. As another example, a language selection or other localization interface may be provided that more prominently identifies the preferred languages relative to other languages available in the application. Other interfaces may be provided.

In an embodiment of the presently disclosed subject matter, a confidence measure may be calculated for each language in the preferred language list developed at 820, and the languages may be ordered according to the confidence measure. The highest confidence measure language may be selected as the primary preferred language of the user. The confidence measure may be, for example, based upon the use of the language by entities in the social graph of the user. As a specific example, the confidence measure may be determined based upon the number of entities in the social graph of the user that use each language in the set of preferred languages. As another example, the confidence measure may be determined based upon the number of messages associated with the user in the language. The messages may be messages, posts, updates, or other items in a single social networking application or across multiple applications.

As a specific example, a first user, User A, may be friends with or otherwise socially connected to Users B, C, and D. User A's language preferences are unknown, but Users B, C, and D all list German as their preferred language. In such a situation, German may be identified as a likely preferred language or primary preferred language, and it therefore may be suggested to User A that German may be a top language preference.

As another example, a confidence measure for a preferred language may be calculated as proportional to the majority preferred language on the user's social graph. For example, a user may have 3 types of connections on his social graph, each with preferred language A, B, and C respectively. The level confidence of a preferred language prediction may be calculated according to $$\text{Confidence} = \max(A, B, C)/(A+B+C)$$

Where A, B, and C are the number of entities on the user's social graph with preferred language A, B, and C, respectively.

Embodiments of the presently disclosed subject matter may include various feedback mechanisms to improve the prediction capabilities of a user's preferred language or languages. For example, predictions of users' preferred languages may be compared to actual preferred languages identified by the same users within the application for which the languages were predicted. Based upon the difference, the rules, correlations, clusters, or other components used to predict the users' preferred languages may be adjusted. As a specific example, if it is found that a rule that prioritizes languages in a user's cookies over languages used in messages sent by a user generally provides incorrect results, the rule may be modified to prioritize a languages identified in sent messages over those identified in the user's cookies. Feedback and other analysis modification techniques for the various techniques disclosed herein will be readily understood by one of skill in the art based upon the present disclosure.

Further, embodiments of the presently disclosed subject matter may be used to derive otherwise unavailable or difficult to obtain information about user language preferences. For example, as geographic language preference data is collected, more precise information about those preferences may become available. For example, embodiments of the presently disclosed subject matter may determine that users within a relatively focused, small geographic region, such as a particular neighborhood or other region of a city are more likely to have a particular language preference relative to other users within the same city. As a specific example, it may be determined that users within a "Chinatown" or other cultural or ethnic region of a city are likely to prefer to access application in an associated language, such as Chinese. Similarly, embodiments of the presently disclosed subject matter may allow for identification of such neighborhoods or regions based upon the distribution of user language preferences.

Embodiments of the presently disclosed subject matter may include privacy protection components and/or controls to safeguard individual user information. For example, information on explicit user preferences and/or language indicators associated with a user may be anonymized so that they cannot be linked to a specific user by name or identity. Some configurations may operate only on aggregate data. For example, when a rule, classifier, or other component is updated based upon explicit user preferences compared to determined language preferences, the update mechanism may use only aggregate data for multiple users to prevent identification of a particular user's preferences in relation to that user's identity. Other privacy protections may be used.

Embodiments of the presently disclosed subject matter may localize an application based upon a preferred language identified for a user. For example, one or more user interface elements of an application may be presented to a user in a preferred language. Less than all of the user interface elements in the application may be presented in the preferred language or the entire application may be presented in a preferred language. For example, where the application is embodied in a web site, the entirety of the web site presented to the user may be presented in a preferred language of the user. Alternatively, some portion of the application may be presented in one or more other languages. As a specific example, if it is determined that the user's primary preferred language is English, all the user interface elements of the application may be presented in English. Alternatively, a portion of the web page may display the other languages available, with each language displayed in that language. For example, if the page is available in French, German, and Italian, the language selection interface may display "Francais", "Deutsch", and "Italiano" (i.e., "French", "German", "Italian" in French, German, and Italian, respectively). Each language may be, for example, a link that causes the rest of the page to be rendered in the selected language.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
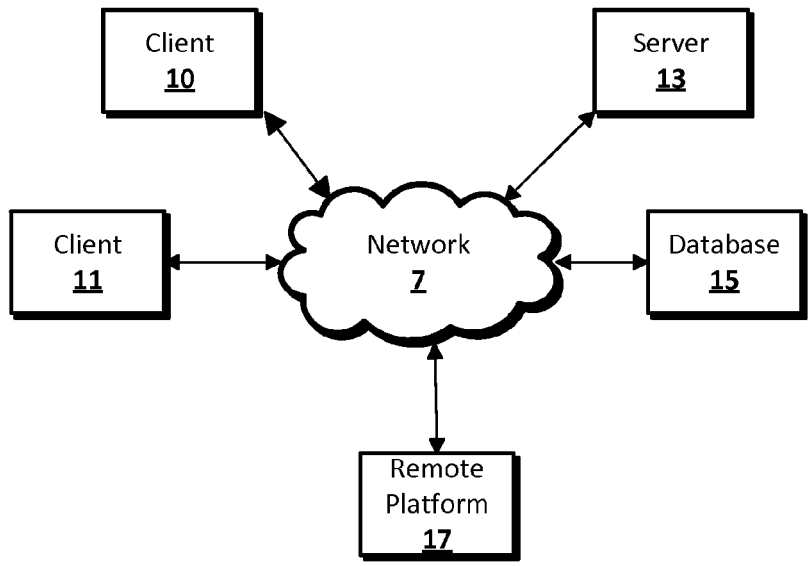
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
obtaining a set of attribute clusters, each cluster associated with a language and each cluster comprising a definition of first a set of language indicators shared among a plurality of users who have a common preferred language;
obtaining a user profile for a user that contains a second set of language indicators, each language indicator related to a language potentially preferred by the user;
by a processor, applying a clustering algorithm to the user profile to associate it with one of the set of attribute clusters having a highest correlation with the second set of language indicators, wherein the highest correlation indicates the likely language preference of the user is more similar to a language preference of users in the one of the set of attribute clusters than to a language preference of users in at least one other of the set of attribute clusters; and
localizing a first application based upon the language associated with the cluster to which the user profile is associated, by performing at least one localization selected from the group consisting of: setting a language of at least one user interface element in the first application, setting a default input language for the user, setting a date format, setting a time format, setting a sort order, and setting a writing directionality.

2. The method of claim 1, wherein localizing the first application comprises presenting a user interface element for a first application to the user in the language associated with the associated cluster.

3. The method of claim 1, further comprising:
receiving language indicators and primary preferred languages for a plurality of users;
based upon the received language indicators, grouping the plurality of users, wherein users having common language indicators are grouped together;
defining the set of attribute clusters based upon the groupings; and
assigning the language associated with each attribute cluster to the attribute cluster based upon a common primary preferred language of users in the cluster.

4. The method of claim 1, wherein the second set of language indicators comprises an indication of a language in which data is accessed by the user in a second application different from the first application.

5. The method of claim 1, wherein the second set of language indicators comprises an indication of a language setting selected by the user for a second application.

6. The method of claim 1, wherein the second set of language indicators comprises an indication of a language specified by a cookie available at the user's browser.

7. The method of claim 1, wherein the first set of language indicators comprises an indication of a language used by a second user, the second user being socially connected to the first user.

8. The method of claim 1, wherein the second set of language indicators comprises an indication of the user's geographical location, a domain name at which the user accesses the application, a language the user's browser is configured to use when the user accesses the application, an input method editor setting associated with the user, a language setting on a device used by the user to access the application, or a combination thereof.

9. The method of claim 1, wherein the second set of language indicators comprises a plurality of language indicators.

10. The method of claim 1, further comprising the step of providing a localization interface to the user, the localization interface comprising a language selection element that prioritizes the preferred languages over at least one other language.

11. A system comprising:
an input configured to obtain a set of attribute clusters, each cluster associated with a language and each cluster defining of a first set of language indicators shared among a plurality of users who have a common preferred language, and to obtain the first set of language indicators, each language indicator related to a language potentially preferred by a user;
a processor configured to:
obtain a user profile for a user that contains a second set of language indicators, each language indicator related to a language potentially preferred by the user;
apply a clustering algorithm to the user profile to associate it with one of the set of attribute clusters having a highest correlation with the second set of language indicators, wherein the highest correlation indicates the likely language preference of the user is more similar to a language preference of users in the one of the set of attribute clusters than to a language preference of users in at least one other of the set of attribute clusters; and
localize a first application based upon the language associated with the cluster to which the user profile is associated, by setting a language for at least one user interface element in the first application, setting a user's default input language, setting a date format, setting a time format, setting a sort order, and setting a writing directionality.

12. The system of claim 11, the processor further configured to present a user interface element for the first application to the user in the language associated with the associated cluster to localize the application.

13. The system of claim 11, the processor further configured to:
receiver language indicators and primary preferred languages for a plurality of users;
based upon the received language indicators, group the plurality of users, wherein users having common language indicators are grouped together;
define the set of user clusters based upon the groupings; and assign the language associated with each cluster to the cluster based upon a common primary preferred language of users in the cluster.

14. The system of claim 11, wherein the set of second language indicators comprises an indication of a language in which data is accessed by the user in a second application different from the first application.

15. The system of claim 11, wherein the second set of language indicators comprises an indication of a language setting selected by the user for a second application.

16. The system of claim 11, wherein the second set of language indicators comprises an indication of a language specified by a cookie available at the user's browser.

17. The system of claim 11, wherein the first set of language indicators comprises an indication of a language used by a second user, the second user being socially connected to the first user.

18. The system of claim 11, wherein the second set of language indicators comprises a plurality of language indicators.

19. The system of claim 11, the processor further configured to provide a localization interface to the user, the localization interface comprising a language selection element that prioritizes the preferred languages over at least one other language.

20. A computer-implemented method comprising:
receiving a first plurality of language indicators and primary preferred languages for a plurality of users;
based upon the received first plurality of language indicators, grouping the plurality of users, wherein users having common language indicators are grouped together;
defining a set of attribute clusters based upon the groupings, wherein each attribute cluster comprises a user grouping; and
assigning the language to each attribute cluster to the cluster based upon a common primary preferred language of users in the cluster;
obtaining a user profile for a user that contains a second plurality of language indicators, each language indicator related to a language potentially preferred by the user;
by a processor, applying a clustering algorithm to the user profile to associate it with one of the set of attribute clusters having a highest correlation with the second set of language indicators, wherein the highest correlation indicates the likely language preference of the user is more similar to a language preference of users in the one of the set of attribute clusters than to a language preference of users in at least one other of the set of attribute clusters;
presenting a user interface element for a first application to the user in the language associated with the cluster to which the user profile is associated; and
providing a localization interface to the user, the localization interface comprising a language selection element that prioritizes the preferred languages over at least one other language.

\* \* \* \* \*